United States Patent
Shintome

(10) Patent No.: US 6,406,535 B1
(45) Date of Patent: Jun. 18, 2002

(54) MATERIAL FOR CONSTRUCTIONAL FINISHED WALLBOARD

(75) Inventor: Masahiro Shintome, Yokohama (JP)

(73) Assignee: Takachiho Corp., Yokahama (JP)

( * ) Notice: Subject to any disclaimer, the term of this patent is extended or adjusted under 35 U.S.C. 154(b) by 0 days.

(21) Appl. No.: 09/661,906

(22) Filed: Sep. 14, 2000

Related U.S. Application Data

(62) Division of application No. 09/354,313, filed on Jul. 16, 1999, now Pat. No. 6,171,655.

(30) Foreign Application Priority Data

Apr. 16, 1999 (JP) .............................. 11-108696

(51) Int. Cl.7 ......................... C04B 14/14; C04B 16/02; C04B 14/10
(52) U.S. Cl. ...................... 106/705; 106/672; 106/772; 106/773; 106/774
(58) Field of Search ............................ 106/772, 773, 106/774, 672, 705

(56) References Cited

U.S. PATENT DOCUMENTS

| | | | | |
|---|---|---|---|---|
| 2,993,016 A | * | 7/1961 | Sucetti | 260/15 |
| 3,869,415 A | * | 3/1975 | Williams | 260/17 R |
| 4,031,684 A | * | 6/1977 | Shibata | 52/612 |
| 4,107,376 A | * | 8/1978 | Ishikawa | 428/306 |

FOREIGN PATENT DOCUMENTS

| | | |
|---|---|---|
| JP | 48-60123 | 8/1973 |
| JP | 50-71711 | 6/1975 |
| JP | 52-104532 | 9/1977 |
| JP | 54062222 | * 5/1979 |
| JP | 54-141015 | 11/1979 |
| JP | 58-55360 | 4/1983 |
| JP | 60-260458 | 12/1985 |
| JP | 6-144895 | 5/1994 |
| JP | 6-191963 | 7/1994 |
| JP | 11-62053 | 3/1999 |

* cited by examiner

Primary Examiner—Michael Barr
(74) Attorney, Agent, or Firm—Kanesaka & Takeuchi

(57) ABSTRACT

A constructional finished wallboard is formed of a mixture including 50 to 65 wt. % of dried shirasu, 30 to 40 wt. % of a plaster component, 3 to 10 wt. % of a clay component, 5 to 10 wt. % of shirasu balloons, 0.8 to 2 wt. % of a bond reinforcing component, 0.01 to 3 wt. % of a color pigment, and 1 to 5 wt. % of fibers for plaster. In preparing the wallboard, after preparing the mixture, an appropriate amount of water is added to the mixture to mix together, which is applied onto a substrate. Then, the surface of the mixture on the substrate is finished, followed by drying to thereby form the constructional finished board.

16 Claims, 1 Drawing Sheet

MATERIAL FOR CONSTRUCTIONAL FINISHED WALLBOARD

CROSS REFERENCE TO RELATED APPLICATION

This is a divisional application of patent application Ser. No. 09/354,313 filed on Jul. 16, 1999 now U.S. Pat. No. 6,171,655.

BACKGROUND OF THE INVENTION AND RELATED ART STATEMENT

The present invention relates to a material for a constructional finished wallboard. The constructional finished wallboard of the invention is of a type so-called Satsuma Naka-Kirishima Kabe, which uses volcanic ash shirasu (hereinafter referred to simply as shirasu) as a material for a constructional finished wall or plaster-finished wall.

Shirasu is a white sandy sediment, and more specifically, shirasu is a generic name for white porous volcanic ejecta and a secondary sediment derived therefrom, which are widely spread in the southern area of Kyushu of Japan. Shirasu is formed such that when magma having a high temperature is erupted and cooled to give rise to crystallization differentiation, main components of magma, such as $SiO_2$, $Al_2O_3$, $Fe_2O_3$, FeO, MgO, CaO, $Na_2O$, and $K_2O$, are crystallized as minerals through crystallization differentiation.

Shirasu comprises about 30 wt. % of crystalline minerals and about 70 wt. % of amorphous volcanic glass. The amorphous volcanic glass has a porous pumice-like structure due to vigorous emission of volatile material of magma and comprises 65 to 73 wt. % of $SiO_2$, 12 to 16 wt. % of $Al_2O_3$, 2 to 4 wt. % of CaO, 3 to 4 wt. % of $Na_2O$, 2 to 4 wt. % of $K_2O$, and 1 to 3 wt. % of iron compounds. The crystalline minerals include plagioclase in a largest amount, and hypersthene, quartz, augite, magnetite and the like in small amounts.

It has been known that when shirasu is quickly heated, softening of glass contained in the shirasu and evaporation of water contained in the shirasu occur at the same time to give rise to foaming of the shirasu, thereby forming hollow spherical bodies which float on water,- so-called shirasu balloons (developed by Kyushu Kogyo Gijutsu Shiken Kenkyusho in 1970). The shirasu balloons are about 30 to 600 μm in size and have features such that they are inexpensive, low in bulk density, high in melting point, low in thermal conductivity, low in dielectric constant, harmless, and free from emission of noxious gas and the like. Recently, the shirasu balloons of 600 to 3,000 μm in size have been produced. As main applications of the shirasu balloons, there may be mentioned a coating material for industrial use, which can be applied in a large thickness because it is lightweight. In recent years, an application have been made largely to a material for constructional use, such as a ceiling board or the like which is light weight and is not required to have so high strength. Further, development of a polymeric composite material using pulverized shirasu is in progress.

A conventional plaster-finished wall and plaster wall as constructional walls include tsuchi kabe (loam-based wall) and shikkui kabe (plaster wall). A loam-based wall comprises clay and sand incorporated therein for prevention of cracking. Further, Tokyo straw or the like is incorporated therein for brown coat or middle coating (naka kabe), and humic dark-colored straw, straw bottom (nemoto wara), Manila hemp, carbon fiber or the like is incorporated therein for scratch coat or basic coating (ara kabe). A plaster wall comprises slaked lime as a main component and, mixed therein, paste, fibers for plaster, straw, paper or the like. Further, diatomaceous earth which is sedimentary earth derived from algae of phytoplanktons is used as a material for a wall substrate, a material for a refractory brick or a material for wall-finishing. As a self-hardening material for a loam-based wall, there may be mentioned lime, dolomite plaster, cement and the like as well as clay. These self-hardening materials may be incorporated into clay to enhance hardening properties.

As stated above, in recent years, studies have been made in the field of construction in utilizing shirasu whose estimated amount is large. However, in most of the above-described conventional techniques, shirasu is processed. Accordingly, there has been no commercially available constructional material which utilizes shirasu in its unprocessed original form to make good use of the abundant resource. In other words, there has been made no effective use of shirasu, which utilizes desirable features inherent in shirasu, as a material for a constructional wallboard, such as plaster-finished wallboard or plaster wallboard.

Further, in view of use of a chemical substance or organic material in the conventional techniques, no substantial measures have been taken with respect to hypersensitivity to an organic compound or with respect to a health-injurious house. Moreover, substantially no use has been made of shirasu as a construction material alternative to sand which has been running short.

In addition, in the conventional techniques, it is required to take special measures with respect to, for example, protection against adverse effect on a human body due to alkalinization during construction, prevention of change of color of wood or development of stain on a wood surface at joints in or between interior posts, veranda, casings, baseboards and the like, prevention of cracks due to treatment of joints between boards as substrates, prevention of peeling by preliminary application of a bond reinforcing agent to surfaces of boards as surface preparation of the boards as substrates.

The present invention has been made in view of the above-mentioned problems inherent in the conventional techniques. It is, therefore, an object of the present invention to provide a material therefore, an object of the present invention to provide a material for a constructional finished wallboard or a material for finishing a constructional substrate, wherein volcanic ash shirasu, which is an abundant natural resource, can be effectively used in its unprocessed original form; mild or rough texture inherent in shirasu can be utilized to appear as a construction material; it can prevent measures with respect to hypersensitivity to an organic compound and with s respect to a health-injurious house; shirasu can be used as a constructional material alternative to sand which has been running short; and it can permit energy savings, resource savings, free from pollution, innoxiousness, and cost savings; and the constructional finished wallboard is a substantially inorganic composition and has good spreadability, colorability, fire resistance, fire-proof properties, sound-proof properties, moisture conditioning properties, antibacterial properties (substantially fungi-free properties), heat retaining and insulating properties, deodorizing properties, air permeability and the like.

SUMMARY OF THE INVENTION

According to the present invention, the above-mentioned object is attained by using a material, for a constructional finished wallboard, comprising dried shirasu in its unprocessed original form as a component.

The material comprises the dried shirasu, a plaster (gypsum) component, a clay component, shirasu balloons, a bond reinforcing agent, color pigment, and fibers.

It is preferred that the material comprise 50 to 65 wt. % of the dried shirasu, 30 to 40 wt. % of the plaster (gypsum) component, 3 to 10 wt. % of the clay component, 5 to 10 wt. % of the shirasu to balloons, 0.8 to 2 wt. % of the bond reinforcing agent, 0.01 to 3 wt. % of the color pigment, and 1 to 5 wt. % of the fibers.

In preparing the constructional finished wallboard, an appropriate amount of water is added to a mixture of 50 to 65 wt. % of the dried shirasu, 30 to 40 wt. % of the plaster component, 3 to 10 wt. % of the clay component, 5 to 10 wt. % of the shirasu balloons, 0.8 to 2 wt. % of the bond reinforcing agent, 0.01 to 3 wt. % of the color pigment and 1 to 5 wt. % of the fibers to mix together. The resulting mixture is applied onto a substrate, such as a gypsum board, veneer plywood, concrete board, mortar-applied waterproof plywood or asbestos board, and the resulting board is subjected to surface-finishing treatment according to an intended design, followed by drying to thereby form a constructional finished board, such as a plaster-finished wallboard or a plaster wallboard.

It is preferred that the dried shirasu has been prepared by screening raw shirasu with a wire sieve or the like to collect shirasu of about 2 mm or less in diameter, and removing impurities contained therein, followed by drying.

It is also preferred that the clay component is incorporated in an amount of about 0.3 to 0.5 parts by weight relative to 6 parts by weight of the dried shirasu to thereby impart hardening properties and plasticity to the dried shirasu.

It is also preferred that the plaster component is incorporated in an amount of about 5 to 6.5 parts by weight relative to 10 parts by weight of the dried shirasu to thereby impart hardening properties and adhesion properties to the dried shirasu.

It is further preferred that the bond reinforcing agent is a nonionic water-soluble cellulose ether or hydroxypropylmethyl cellulose.

It is further preferred that the clay component is a hydrous silicate mineral which exhibits plasticity when wetted and shows stiffness when dried.

In the material and the method according to the present invention, the dried shirasu is used, which is derived only from a natural material in its unprocessed original form and which contains no chemical substances. Accordingly, the material and the method are free from a chemical substance, such as formaldehyde which is likely to generate in the conventional techniques. Thus, it is possible to provide preventive measures with respect to hypersensitivity to an organic compound and with respect to a health-injurious house, and to make use of shirasu as a constructional material alternative to sand which has been running short. Also, it is possible to contribute to construct health-beneficial houses.

Further, since the material comprises 50 to 65 wt. % of the dried shirasu, 30 to 40 wt. % of the plaster component, 3 to 10 wt. % of the clay component, 5 to 10 wt. % of the shirasu balloons, 0.8 to 2 wt. % of the bond reinforcing agent, 0.01 to 3 wt. % of the color pigment and 1 to 5 wt. % of the fibers for plaster, preparation of the material and usage thereof on site do not require a large amount of energy, such as electric power, fossil fuel energy or the like, to thereby prevent pollution. Further, since the constructional finished wallboard has a substantially inorganic composition, it is resistant to ultraviolet and heat and yet tolerant of natural disaster caused by, for example, fire, flood or typhoon. In addition, the constructional finished wallboard has air-permeability because of the pumice-like porous structure of shirasu, and accordingly, it contributes to protection of a house structure from dew condensation or the like and exhibits dehumidifying properties and antibacterial properties inhibiting fungal attack or the like.

The plaster component functions as a binder for the dried shirasu, and the clay component provides preferable plasticity in terms of on-site operation, and the shirasu balloons impart a mild texture to a surface of the finished wallboard.

The bond reinforcing agent provides good trowel-ability in application and prevents a surface of the wallboard from flouring when the surface is dried, and the fibers for plaster functions as a binder and crack preventive agent.

DETAILED DESCRIPTION OF THE PREFERRED EMBODIMENTS

Figure 1:
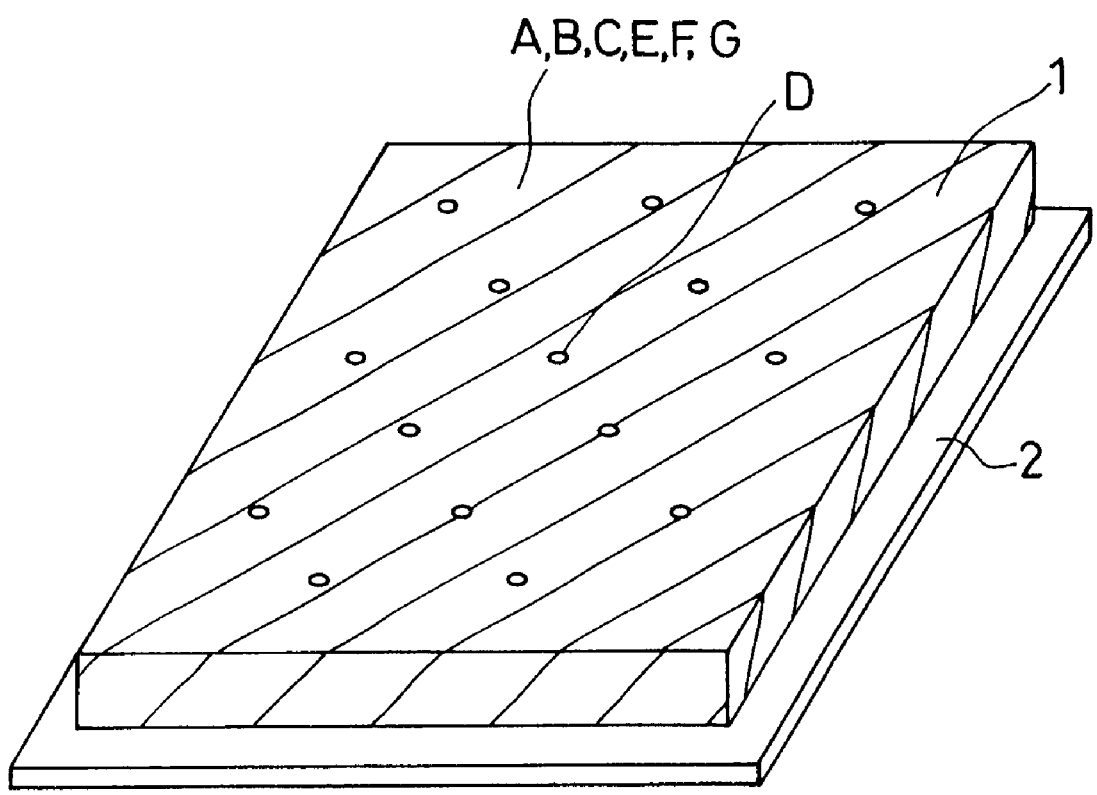
FIG. 1 is a perspective view showing an embodiment of the constructional finished wallboard according to the present invention.

In the following, embodiments of the present invention will be described with reference to the drawing. In FIG. 1, reference 1 represents a constructional finished wallboard, which uses shirasu as a main component of a material for a constructional finished wall or plastering-finished wall in accordance with the present invention, and therefore, which is of a type referred to as Satsuma Nala-Kirishima Kabe. To form the constructional finished wallboard 1, 50 to 65 wt. %, preferably about 53 wt. %, of dried shirasu (A), 30 to 40 wt. %, preferably about 34 wt. %, of a plaster (gypsum) component (B), 3 to 10 wt. %, preferably about 3 wt. %, of clay component (C), 5 to 10 wt. %, preferably about 7 wt. %, of shirasu balloons (D), 0.8 to 2 wt. %, preferably about 1 wt. %, of a bond reinforcing agent (E), 0.01 to 3 wt. %, preferably about 1 wt. %, of color pigment (F), and 1 to 5 wt. %, preferably about 1 wt. %, of fibers for plaster (G), are mixed.

Specifically, the dried shirasu (A) is prepared by screening raw shirasu with a wire sieve or the like to collect shirasu of preferably about 2 mm or less in diameter, and removing impurities contained therein, followed by drying. As the plaster component (B), for example, gypsum plaster which serves as a binder for the dried shirasu (A) is used. As the clay component (C), for example, clay-based cement is used for imparting plasticity in view of operational convenience. The shirasu balloons (D) are used for imparting soft and mild texture to a finished surface. As the bind reinforcing agent (E), a vegetable paste or the like is used for improving trowel-ability and for preventing a wall surface from flouring or forming powders when the wall surface is dried. For example, the bond reinforcing agent (E) may be prepared by mixing 0.03 to 1 wt. %, e.g. 0.05 wt. %, (based on the weight of the 5 components (A) to (G)) of cotton, and 0.05 to 1 wt. %, e.g. 0.09 wt. %, (based on the weight of the components (A) to (G)) of powder of a sea vegetable, such as red algae, which is obtained by boiling down the sea vegetable. As the fibers for plastering (G), hemp fibers, thatch fibers or the like are used which serve as a binder LD. and crack preventive agent.

When these components are formulated as preliminarily blended goods, about 53 wt. % of the dried shirasu (A), about 3 wt. % of the clay component (c), about 7 wt. % of the shirasu balloons (D), about 1 wt. % of the bond reinforcing agent (E), about 1 wt. % of the color pigment (F), and about 1 wt. % of the fibers for plaster (G) are preliminarily mixed and packed in a bag, a bottle or the like. On the other hand, about 34 wt. % of the plaster component (B) is packed in another bag or the like. The contents of the two packs are mixed together in situ, to which water is directly added thereto, and the resultant is mixed. Then, the resulting mixture is applied with a trowel or the like.

The gypsum plaster as the plaster component (B) is a self-hardening cement which has relatively high resistance to shrinkage and crack, and comprises calcined gypsum as a main component. The calcined gypsum is hemihydrated gypsum, and when mixed with water, it captures water of crystallization as a result of hydration reaction to form gypsum dihydrate. Then, when excess water other than water of crystallization evaporates, it hardens. The gypsum plaster includes a field-mix plaster which comprises calcined gypsum as a main component and a hardening retarder added thereto for regulating hardening time; and a pre-mixed plaster which comprises the same components as in the field-mix plaster and, additionally incorporated therein, river sand, silica sand, lightweight aggregate, calcium carbonate or the like. These plasters are selected according to applications.

As the clay component (C), there may be used a hydrous silicate mineral which exhibits plasticity when wetted and shows stiffness when dried, for example, clayey cement material containing silicon dioxide, aluminum oxide, iron oxide, magnesium oxide, calcium oxide, titanium oxide and the like as its components. Such a clayey cement material is excellent particularly in adhesiveness, plasticity and dispersion properties, and it has a pH value of 5.9, a plasticity index of 22.1 and a particle size of $74\mu$ 97% pass.

With respect to the shirasu balloons (D), those as described before are used.

As the bond reinforcing agent (E), a nonionic water-soluble cellulose ether, hydroxypropylmethyl cellulose or the like may be used, which is prepared by substituting in part hydrogen atoms of hydroxyl groups of natural cellulose fibers (pulp) as a starting material with a methyl group, a hydroxypropyl group, a hydroxyethyl group or the like to eliminate hydrogen bonds with a view to permitting water to readily enter between cellulose molecules to impart good water retention characteristics. In this connection, the bond reinforcing agent (E) is so selected as to minimize impartment of gloss to a surface of a wallboard. For example, the bond reinforcing agent having a viscosity of the order of 400–4,000 mPa·s is selected.

The color pigment (F) may be alkali-resistant inorganic or organic pigment, and a mixture thereof, which is interposed between or adheres to particles of cement, lime, gypsum plaster or the like to thereby develop an intended color. As the inorganic pigment, there may be mentioned titanium oxide, titanium oxide having rutile structure, chromium oxide, zinc oxide, white lead, barium sulfate, whiting (chalk), carbon, kaolin, talc, bentonite, red iron oxide, chrome yellow, yellow oxide, black iron oxide, ferric oxide, ultramarine, cobalt blue, cobalt violets, and zinc chromate, and silicon-treated product thereof. As the organic pigment, there may be mentioned quinacridone, Watchung Red, and dioxazine violet.

The dried shirasu (A) per se has neither self-hardening properties nor adhesion properties. Accordingly, in order to impart hardening properties and adhesion properties to the dried shirasu (A), the plaster component (B) is incorporated in an amount of, for example, about 4 to 6.5 parts by weight relative to 10 parts by weight of the dried shirasu (A). However, if large amounts of the plaster component (B) and the clay component (C) are incorporated to result in too high viscosity, small cracks are likely to occur on a finished surface. To avoid this, the amounts of the plaster component (B) and the clay component (C) should appropriately be selected. Since the dried shirasu (A) has particle sizes widely ranging from a coarse grain to a minute particle, the fibers for plaster (G) as reinforcing materials are used with a view to improving particle-particle bonding effect to thereby prevent cracks from occurring.

To impart hardening property and plasticity to the dried shirasu (A), the clay component (C) is incorporated in an amount of, for example, 0.3 to 1.7, preferably about 0.5, parts by weight relative to 6 parts by weight of the dried shirasu (A).

In the following, an example of an application of the present invention will be described. For example, a pre-mix comprising about 53 wt. % of the dried shirasu (A), about 3 wt. % of the clay component (C), about 7 wt. % of the shirasu balloons (D), about 1 wt. % of the bond reinforcing agent (E), about 1 wt. % of the color pigment (F), and about 1 wt. % of the fibers for plaster (G) is mixed with about 34 wt. % of the plaster component (B) in situ, and an appropriate amount of water is directly added thereto. The amount of water is usually about 8 liter for 20 kg of the components (A) to (G). The resultant is mixed, and the mixture is applied with a trowel or the like.

The dried shirasu advantageously has a very light gray color and thus readily colored. For example, a commercially available customary pigment for plaster may be used as the color pigment. When it is intended to provide a finished surface with a pattern, the mixture is applied in the thickness about 5 mm as a base with a trowel or the like, and after hardening proceeds to an appropriate degree, the base is subjected to scrubbing, scribing, pushing, rolling or the like by means of a comb, trowel, roller or the like. In this embodiment, the finished wallboard is used as an interior wallboard to make good use of features inherent in shirasu. However, the finished wallboard may also be used as an exterior wallboard, floor, ceiling or the like.

The present invention is constructed as described above. In particular, the present invention effectively uses volcanic ash shirasu, which is an abundant natural resource in its unprocessed original form. By virtue of this, the present invention is capable of imparting mild or rough texture inherent in shirasu to appearance of the constructional finished wallboard 1, and is capable of providing preventive measures with respect to hypersensitivity to an organic compound and with respect to a health-injurious house. Also, it can be used as a constructional material alternative to sand which has been running short, and is capable of providing energy savings, resource savings, free pollution, innoxiousness, and cost savings. Also, it can provide the constructional finished wallboard, which exhibits good spreadability, colorability, fire resistance, fire-proof properties, sound-proof properties, moisture conditioning properties, antibacterial properties (substantially fungi-free properties), heat retaining and insulating properties, deodorizing properties, air permeability and the like.

This is attributable to the fact that in the present invention, the dried shirasu (A) is used, which is derived only from a natural material in its unprocessed original form and which contains no chemical substances. Accordingly, the material and the method are free from a chemical substance such as formaldehyde which is likely to occur in the conventional techniques, and thus capable of providing preventive measures with respect to hypersensitivity to an organic compound and with respect to a health-injurious house. It is also possible to use shirasu as a constructional material alternative to sand which has been running short, to thereby contribute to construction of health-beneficial houses. In particular, since the wallboard is alkalescent in application, adverse effect on a human body during the application is prevented.

Further, the alkalescence prevents discoloration of wood or development of stain on a wood surface at joints in or between interior posts, a veranda, casings, baseboards and the like. Also, it is possible to prevent cracks at joints between substrates simply by sticking kraft paper having a width of about 5 cm on the joints as joint treatment between the substrates. Further, prevention of cracks may be effected by controlling the amount of the fibers for plaster (G) which has influence on penetration of water and drying rate during application. Moreover, even if no bond reinforcing agent is preliminarily applied to the surfaces of the boards for surface preparation as the substrates 2, the constructional finished wallboard 1 is unsusceptible to peeling.

Further, since the material for the constructional finished wallboard of the present invention comprises 50 to 65 wt. % of the dried shirasu (A), 30 to 40 wt. % of the plaster component (B), 3 to 10 wt. % of the clay component (C), 5 to 10 wt. % of the shirasu balloons (D), 0.8 to 2 wt. % of the bond reinforcing agent (E), 0.01 to 3 wt. % of the color pigment (F), and 1 to 5 wt. % of the fibers for plaster (G), the constructional finished wallboard 1 can readily and inexpensively be prepared without using a large amount of energy such as electric power, fossil fuel energy or the like in preparation of the material or in on-site operation without causing pollution. Further, since the constructional finished wallboard is the substantially inorganic composition, it is resistant to ultraviolet and heat and yet tolerant of natural disaster caused by, for example, fire, flood or typhoon. In addition, the constructional finished wallboard has air-permeability because of the pumice-like porous structure of shirasu, and accordingly, it contributes to protect a house from dew condensation or the like and exhibits moisture or humidity conditioning properties and antibacterial properties inhibiting fungal attack or the like.

The plaster component (B) functions as a binder for the dried shirasu (A). The clay component (C) consists essentially of a hydrous silicate mineral which exhibits plasticity when wetted and shows stiffness when dried. Accordingly, the clay component (C) provides preferable plasticity in various steps of processing. The shirasu balloons (D) impart soft and mild texture to a finished surface of the wallboard. The bond reinforcing agent (E) is a nonionic water-soluble cellulose ether, hydroxypropylmethyl cellulose or the like. Accordingly, the bond reinforcing agent (E) provides good trowel-ability and prevents the surface of the wallboard from flouring or becoming powder condition when the surface is dried to thereby prevent a person's body, cloths or the like from being smudged with dust derived from flouring. The fibers for plaster (G) functions as a binder and thus prevents cracking of the wallboard.

While the invention has been explained with reference to the specific embodiments of the invention, the explanation is illustrative and the invention is limited only by the appended claims.

What is claimed is:

1. A material for finishing a constructional substrate, comprising 50 to 65 wt. % of a dried shirasu in an original form, 30 to 40 wt. % of a gypsum plaster, 3 to 10 wt. % of a clay component, 5 to 10 wt. % of shirasu balloons, 0.8 to 2 wt. % of a bond reinforcing agent, 0.01 to 3 wt. % of a color pigment, and 1 to 5 wt. % of fibers for plaster.

2. The material according to claim 1, wherein said dried shirasu has a diameter of at most 2 mm without impurities.

3. The material according to claim 1, wherein the clay component is incorporated in an amount of about 0.3 to 0.5 parts by weight relative to 6 parts by weight of the dried shirasu to thereby impart hardening properties and plasticity to the dried shirasu.

4. The material according to claim 3, wherein the gypsum plaster is incorporated in an amount of about 5 to 6.5 parts by weight relative to 10 parts by weight of the dried shirasu to thereby impart hardening properties and adhesion properties to the dried shirasu.

5. The material according to claim 1, wherein the bond reinforcing agent is a nonionic water-soluble cellulose ether or hydroxypropylmethyl cellulose.

6. The material according to claim 1, wherein the clay component consists essentially of a hydrous silicate mineral which exhibits plasticity when wetted and shows stiffness when dried.

7. The material according to claim 1, wherein said dried shirasu comprises about 30 wt. % of crystalline minerals including plagioclase, hypersthene, quartz, augite and magnetite, and about 70 wt. % of amorphous volcanic glass including 65 to 73 wt. % of $SiO_2$, 12 to 16 wt. % of $Al_2O_3$, 2 to 4 wt. % of CaO, 3 to 4 wt. % of $Na_2O$, 2 to 4 wt. % of $K_2O$ and 1 to 3 wt. % of iron compounds.

8. The material according to claim 1, wherein the gypsum plaster is incorporated in an amount of about 5 to 6.5 parts by weight relative to 10 parts by weight of the dried shirasu to thereby impart hardening properties and adhesion properties to the dried shirasu.

9. A material for finishing a constructional substrate, comprising 50 to 65 wt. % of a dried shirasu in an original form, 30 to 40 wt. % of a gypsum plaster, 3 to 10 wt. % of a clay component, 5 to 10 wt. % of shirasu balloons, 0.8 to 2 wt. % of a bond reinforcing agent, and 1 to 5 wt. % of fibers for plaster.

10. The material according to claim 9, wherein said dried shirasu has a diameter of at most 2 mm without impurities.

11. The material according to claim 9, wherein the clay component is incorporated in an amount of about 0.3 to 0.5 parts by weight relative to 6 parts by weight of the dried shirasu to thereby impart hardening properties and plasticity to the dried shirasu.

12. The material according to claim 9, wherein the gypsum plaster is incorporated in an amount of about 5 to 6.5 parts by weight relative to 10 parts by weight of the dried shirasu to thereby impart hardening properties and adhesion properties to the dried shirasu.

13. The material according to claim 11, wherein the gypsum plaster is incorporated in an amount of about 5 to 6.5 parts by weight relative to 10 parts by weight of the dried shirasu to thereby impart hardening properties and adhesion properties to the dried shirasu.

14. The material according to claim 9, wherein the bond reinforcing agent is a nonionic water-soluble cellulose ether or hydroxypropylmethyl cellulose.

15. The material according to claim 9, wherein the clay component consists essentially of a hydrous silicate mineral which exhibits plasticity when wetted and shows stiffness when dried.

16. The material according to claim 9, wherein said dried shirasu comprises about 30 wt. % of crystalline minerals including plagioclase, hypersthene, quartz, augite and magnetite, and about 70 wt. % of amorphous volcanic glass including 65 to 73 wt. % of $SiO_2$, 12 to 16 wt. % of $Al_2O_3$, 2 to 4 wt. % of CaO, 3 to 4 wt. % of $Na_2O$, 2 to 4 wt. % of $K_2O$ and 1 to 3 wt. % of iron compounds.

* * * * *